United States Patent
Liao et al.

(10) Patent No.: US 11,805,139 B1
(45) Date of Patent: Oct. 31, 2023

(54) MULTICLASS CLASSIFICATION SYSTEM WITH ACCUMULATOR-BASED ARBITRATION

(71) Applicant: Trend Micro Incorporated, Tokyo (JP)

(72) Inventors: Chinghsien Liao, Cupertino, CA (US); Daniel Cheng, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 384 days.

(21) Appl. No.: 17/156,869

(22) Filed: Jan. 25, 2021

(51) Int. Cl.
  *G06N 5/04* (2023.01)
  *G06N 20/00* (2019.01)
  *G06F 16/28* (2019.01)
  *H04L 9/40* (2022.01)

(52) U.S. Cl.
  CPC ........ *H04L 63/1425* (2013.01); *G06F 16/285* (2019.01); *G06N 5/04* (2013.01); *G06N 20/00* (2019.01); *H04L 63/0457* (2013.01); *H04L 63/20* (2013.01)

(58) Field of Classification Search
  USPC ........................................................ 713/168
  See application file for complete search history.

(56) References Cited

U.S. PATENT DOCUMENTS

| | | | |
|---|---|---|---|
| 7,742,641 B2 | 6/2010 | Ivanov et al. | |
| 9,705,904 B1* | 7/2017 | Davis | G06F 21/562 |
| 10,133,988 B2 | 11/2018 | Ribeiro et al. | |
| 10,242,295 B2 | 3/2019 | Jiang et al. | |
| 10,289,910 B1* | 5/2019 | Chen | G06N 3/084 |
| 2018/0053401 A1* | 2/2018 | Martin | H04L 67/10 |
| 2018/0068233 A1* | 3/2018 | Miranda | G06N 20/10 |
| 2018/0075309 A1* | 3/2018 | Sathyanarayana | G05D 1/0055 |
| 2019/0114673 A1 | 4/2019 | Gupta et al. | |
| 2019/0253442 A1* | 8/2019 | Brabec | G06N 20/00 |

OTHER PUBLICATIONS

Shipmon et al., "Time Series Anomaly Detection", Google, Inc., arXiv Forum, Aug. 11, 2017, pp. 1-5 (Year: 2017).*

* cited by examiner

*Primary Examiner* — Sakinah White Taylor
(74) *Attorney, Agent, or Firm* — Beyer Law Group LLP

(57) ABSTRACT

A multiclass classifier generates a probability vector for individual data units of an input data stream. The probability vector has prediction probability values for classes that the multiclass classifier has been trained to detect. A class with the highest prediction probability value among the classes in a probability vector is selected as the predicted class. A confidence score is calculated based on the prediction probability value of the class. Confidence scores of the class are accumulated within a sliding window. The class is declared to be the detected class of the input data stream when the accumulated value of the class meets an accumulator threshold. A security policy for an application program that is mapped to the class is enforced against the input data stream.

15 Claims, 12 Drawing Sheets

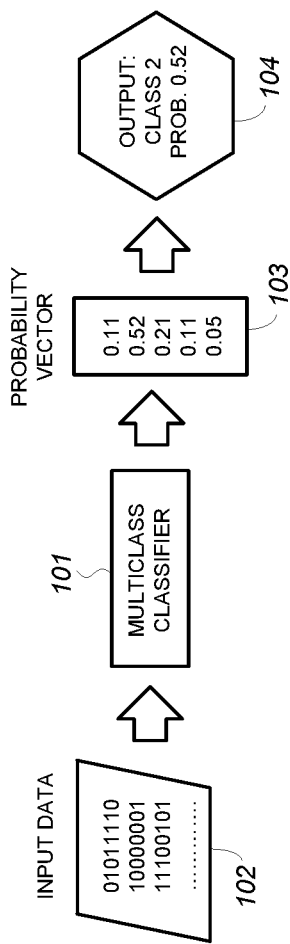
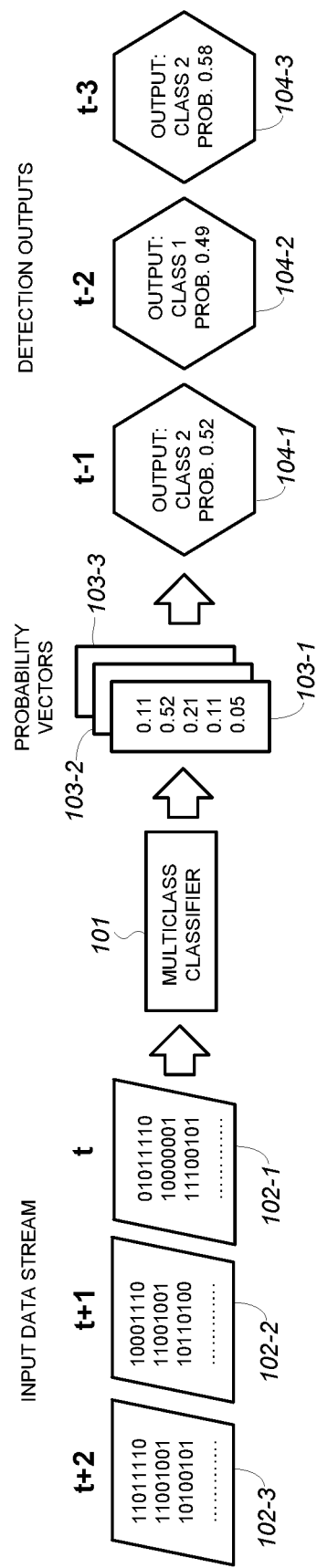
FIG. 1
(PRIOR ART)
FIG. 2
(PRIOR ART)

| INPUT SEQUENCE | 1 |
|---|---|
| PROBABILITY VECTOR | 0.11<br>0.52<br>0.21<br>0.11<br>0.05 |
| PREDICTED CLASS | CLASS 2 |
| MAX PROBABILITY | 0.52 |
| MEET PROBABILITY THRESHOLD? | YES |
| CONFIDENCE SCORE | CLASS 2<br>0.10 |
| ACCUMULATOR VECTOR | 0.00<br>0.10<br>0.00<br>0.00<br>0.00 |
| DETECTED CLASS | NONE |

| INPUT SEQUENCE | 1 | 2 |
|---|---|---|
| PROBABILITY VECTOR | 0.11<br>0.52<br>0.21<br>0.11<br>0.05 | 0.40<br>0.22<br>0.06<br>0.21<br>0.11 |
| PREDICTED CLASS | CLASS 2 | CLASS 1 |
| MAX PROBABILITY | 0.52 | 0.40 |
| MEET PROBABILITY THRESHOLD? | YES | NO |
| CONFIDENCE SCORE | CLASS 2<br>0.10 | N/A |
| ACCUMULATOR VECTOR | 0.00<br>0.10<br>0.00<br>0.00<br>0.00 | 0.00<br>0.10<br>0.00<br>0.00<br>0.00 |
| DETECTED CLASS | NONE | NONE |

| INPUT SEQUENCE | 1 | 2 | 3 |
|---|---|---|---|
| PROBABILITY VECTOR | 0.11<br>0.52<br>0.21<br>0.11<br>0.05 | 0.40<br>0.22<br>0.06<br>0.21<br>0.11 | 0.04<br>0.62<br>0.11<br>0.11<br>0.12 |
| PREDICTED CLASS | CLASS 2 | CLASS 1 | CLASS 2 |
| MAX PROBABILITY | 0.52 | 0.40 | 0.62 |
| MEET PROBABILITY THRESHOLD? | YES | NO | YES |
| CONFIDENCE SCORE | CLASS 2<br>0.10 | N/A | CLASS 2<br>0.60 |
| ACCUMULATOR WITH SLIDING WINDOW | 0.00<br>0.10<br>0.00<br>0.00<br>0.00 | 0.00<br>0.10<br>0.00<br>0.00<br>0.00 | 0.00<br>0.70<br>0.00<br>0.00<br>0.00 |
| DETECTED CLASS | NONE | NONE | NONE |

| INPUT SEQUENCE | 1 | 2 | 3 | 4 |
|---|---|---|---|---|
| PROBABILITY VECTOR | 0.11<br>0.52<br>0.21<br>0.11<br>0.05 | 0.40<br>0.22<br>0.06<br>0.21<br>0.11 | 0.04<br>0.62<br>0.11<br>0.11<br>0.12 | 0.11<br>0.32<br>0.41<br>0.12<br>0.04 |
| PREDICTED CLASS | CLASS 2 | CLASS 1 | CLASS 2 | CLASS 3 |
| MAX PROBABILITY | 0.52 | 0.40 | 0.62 | 0.41 |
| MEET PROBABILITY THRESHOLD? | YES | NO | YES | NO |
| CONFIDENCE SCORE | CLASS 2<br>0.10 | N/A | CLASS 2<br>0.60 | N/A |
| ACCUMULATOR VECTOR | 0.00<br>0.10<br>0.00<br>0.00<br>0.00 | 0.00<br>0.10<br>0.00<br>0.00<br>0.00 | 0.00<br>0.70<br>0.00<br>0.00<br>0.00 | 0.00<br>0.70<br>0.00<br>0.00<br>0.00 |
| DETECTED CLASS | NONE | NONE | NONE | NONE |

404

| INPUT SEQUENCE | 1 | 2 | 3 | 4 | 5 |
|---|---|---|---|---|---|
| PROBABILITY VECTOR | 0.11<br>0.52<br>0.21<br>0.11<br>0.05 | 0.40<br>0.22<br>0.06<br>0.21<br>0.11 | 0.04<br>0.62<br>0.11<br>0.11<br>0.12 | 0.11<br>0.32<br>0.41<br>0.12<br>0.04 | 0.22<br>0.45<br>0.21<br>0.11<br>0.01 |
| PREDICTED CLASS | CLASS 2 | CLASS 1 | CLASS 2 | CLASS 3 | CLASS 2 |
| MAX PROBABILITY | 0.52 | 0.40 | 0.62 | 0.41 | 0.45 |
| MEET PROBABILITY THRESHOLD? | YES | NO | YES | NO | NO |
| CONFIDENCE SCORE | CLASS 2<br>0.10 | N/A | CLASS 2<br>0.60 | N/A | N/A |
| ACCUMULATOR VECTOR | 0.00<br>0.10<br>0.00<br>0.00<br>0.00 | 0.00<br>0.10<br>0.00<br>0.00<br>0.00 | 0.00<br>0.70<br>0.00<br>0.00<br>0.00 | 0.00<br>0.70<br>0.00<br>0.00<br>0.00 | 0.00<br>0.70<br>0.00<br>0.00<br>0.00 |
| DETECTED CLASS | NONE | NONE | NONE | NONE | NONE |

| INPUT SEQUENCE | 1 | 2 | 3 | 4 | 5 | 6 |
|---|---|---|---|---|---|---|
| PROBABILITY VECTOR | 0.11<br>0.52<br>0.21<br>0.11<br>0.05 | 0.40<br>0.22<br>0.06<br>0.21<br>0.11 | 0.04<br>0.62<br>0.11<br>0.11<br>0.12 | 0.11<br>0.32<br>0.41<br>0.12<br>0.04 | 0.22<br>0.45<br>0.21<br>0.11<br>0.01 | 0.11<br>0.21<br>0.52<br>0.11<br>0.05 |
| PREDICTED CLASS | CLASS 2 | CLASS 1 | CLASS 2 | CLASS 3 | CLASS 2 | CLASS 3 |
| MAX PROBABILITY | 0.52 | 0.40 | 0.62 | 0.41 | 0.45 | 0.52 |
| MEET PROBABILITY THRESHOLD? | YES | NO | YES | NO | NO | YES |
| CONFIDENCE SCORE | CLASS 2<br>0.10 | N/A | CLASS 2<br>0.60 | N/A | N/A | CLASS 3<br>0.10 |
| ACCUMULATOR VECTOR | 0.00<br>0.10<br>0.00<br>0.00<br>0.00 | 0.00<br>0.10<br>0.00<br>0.00<br>0.00 | 0.00<br>0.70<br>0.00<br>0.00<br>0.00 | 0.00<br>0.70<br>0.00<br>0.00<br>0.00 | 0.00<br>0.70<br>0.00<br>0.00<br>0.00 | 0.00<br>0.60<br>0.10<br>0.00<br>0.00 |
| DETECTED CLASS | NONE | NONE | NONE | NONE | NONE | NONE |

| INPUT SEQUENCE | 1 | 2 | 3 | 4 | 5 | 6 | 7 |
|---|---|---|---|---|---|---|---|
| PROBABILITY VECTOR | 0.11<br>0.52<br>0.21<br>0.11<br>0.05 | 0.40<br>0.22<br>0.06<br>0.21<br>0.11 | 0.04<br>0.62<br>0.11<br>0.11<br>0.12 | 0.11<br>0.32<br>0.41<br>0.12<br>0.04 | 0.22<br>0.45<br>0.21<br>0.11<br>0.01 | 0.11<br>0.21<br>0.52<br>0.11<br>0.05 | 0.11<br>0.56<br>0.20<br>0.10<br>0.03 |
| PREDICTED CLASS | CLASS 2 | CLASS 1 | CLASS 2 | CLASS 3 | CLASS 2 | CLASS 3 | CLASS 2 |
| MAX PROBABILITY | 0.52 | 0.40 | 0.62 | 0.41 | 0.45 | 0.52 | 0.56 |
| MEET PROBABILITY THRESHOLD? | YES | NO | YES | NO | NO | YES | YES |
| CONFIDENCE SCORE | CLASS 2<br>0.10 | N/A | CLASS 2<br>0.60 | N/A | N/A | CLASS 3<br>0.10 | CLASS 2<br>0.30 |
| ACCUMULATOR VECTOR | 0.00<br>0.10<br>0.00<br>0.00<br>0.00 | 0.00<br>0.10<br>0.00<br>0.00<br>0.00 | 0.00<br>0.70<br>0.00<br>0.00<br>0.00 | 0.00<br>0.70<br>0.00<br>0.00<br>0.00 | 0.00<br>0.70<br>0.00<br>0.00<br>0.00 | 0.00<br>0.60<br>0.10<br>0.00<br>0.00 | 0.00<br>0.90<br>0.10<br>0.00<br>0.00 |
| DETECTED CLASS | NONE | NONE | NONE | NONE | NONE | NONE | NONE |

| INPUT SEQUENCE | 1 | 2 | 3 | 4 | 5 | 6 | 7 | 8 |
|---|---|---|---|---|---|---|---|---|
| PROBABILITY VECTOR | 0.11<br>0.52<br>0.21<br>0.11<br>0.05 | 0.40<br>0.22<br>0.06<br>0.21<br>0.11 | 0.04<br>0.62<br>0.11<br>0.11<br>0.12 | 0.11<br>0.32<br>0.41<br>0.12<br>0.04 | 0.22<br>0.45<br>0.21<br>0.11<br>0.01 | 0.11<br>0.21<br>0.52<br>0.11<br>0.05 | 0.11<br>0.56<br>0.20<br>0.10<br>0.03 | 0.12<br>0.21<br>0.21<br>0.43<br>0.03 |
| PREDICTED CLASS | CLASS 2 | CLASS 1 | CLASS 2 | CLASS 3 | CLASS 2 | CLASS 3 | CLASS 2 | CLASS 4 |
| MAX PROBABILITY | 0.52 | 0.40 | 0.62 | 0.41 | 0.45 | 0.52 | 0.56 | 0.43 |
| MEET PROBABILITY THRESHOLD? | YES | NO | YES | NO | NO | YES | YES | NO |
| CONFIDENCE SCORE | CLASS 2<br>0.10 | N/A | CLASS 2<br>0.60 | N/A | N/A | CLASS 3<br>0.10 | CLASS 2<br>0.30 | N/A |
| ACCUMULATOR VECTOR | 0.00<br>0.10<br>0.00<br>0.00<br>0.00 | 0.00<br>0.10<br>0.00<br>0.00<br>0.00 | 0.00<br>0.70<br>0.00<br>0.00<br>0.00 | 0.00<br>0.70<br>0.00<br>0.00<br>0.00 | 0.00<br>0.70<br>0.00<br>0.00<br>0.00 | 0.00<br>0.60<br>0.10<br>0.00<br>0.00 | 0.00<br>0.90<br>0.10<br>0.00<br>0.00 | 0.00<br>0.30<br>0.10<br>0.00<br>0.00 |
| DETECTED CLASS | NONE | NONE | NONE | NONE | NONE | NONE | NONE | NONE |

FIG. 11

| INPUT SEQUENCE | 1 | 2 | 3 | 4 | 5 | 6 | 7 | 8 | 9 |
|---|---|---|---|---|---|---|---|---|---|
| PROBABILITY VECTOR | 0.11<br>0.52<br>0.21<br>0.11<br>0.05 | 0.40<br>0.22<br>0.06<br>0.21<br>0.11 | 0.04<br>0.62<br>0.11<br>0.11<br>0.12 | 0.11<br>0.32<br>0.41<br>0.12<br>0.04 | 0.22<br>0.45<br>0.21<br>0.11<br>0.01 | 0.11<br>0.21<br>0.52<br>0.11<br>0.05 | 0.11<br>0.56<br>0.20<br>0.10<br>0.03 | 0.12<br>0.21<br>0.21<br>0.43<br>0.03 | 0.11<br>0.54<br>0.20<br>0.11<br>0.04 |
| PREDICTED CLASS | CLASS 2 | CLASS 1 | CLASS 2 | CLASS 3 | CLASS 2 | CLASS 3 | CLASS 2 | CLASS 4 | CLASS 2 |
| MAX PROBABILITY | 0.52 | 0.40 | 0.62 | 0.41 | 0.45 | 0.52 | 0.56 | 0.43 | 0.54 |
| MEET PROBABILITY THRESHOLD? | YES | NO | YES | NO | NO | YES | YES | NO | YES |
| CONFIDENCE SCORE | CLASS 2<br>0.10 | N/A | CLASS 2<br>0.60 | N/A | N/A | CLASS 3<br>0.10 | CLASS 2<br>0.30 | N/A | CLASS 2<br>0.20 |
| ACCUMULATOR VECTOR | 0.00<br>0.10<br>0.00<br>0.00<br>0.00 | 0.00<br>0.10<br>0.00<br>0.00<br>0.00 | 0.00<br>0.70<br>0.00<br>0.00<br>0.00 | 0.00<br>0.70<br>0.00<br>0.00<br>0.00 | 0.00<br>0.70<br>0.00<br>0.00<br>0.00 | 0.00<br>0.60<br>0.10<br>0.00<br>0.00 | 0.00<br>0.90<br>0.10<br>0.00<br>0.00 | 0.00<br>0.30<br>0.10<br>0.00<br>0.00 | 0.00<br>0.50<br>0.10<br>0.00<br>0.00 |
| DETECTED CLASS | NONE | NONE | NONE | NONE | NONE | NONE | NONE | NONE | NONE |

FIG. 12

| INPUT SEQUENCE | 1 | 2 | 3 | 4 | 5 | 6 | 7 | 8 | 9 | 10 |
|---|---|---|---|---|---|---|---|---|---|---|
| PROBABILITY VECTOR | 0.11<br>0.52<br>0.21<br>0.11<br>0.05 | 0.40<br>0.22<br>0.06<br>0.21<br>0.11 | 0.04<br>0.62<br>0.11<br>0.11<br>0.12 | 0.11<br>0.32<br>0.41<br>0.12<br>0.04 | 0.22<br>0.45<br>0.21<br>0.11<br>0.01 | 0.11<br>0.21<br>0.52<br>0.11<br>0.05 | 0.11<br>0.56<br>0.20<br>0.10<br>0.03 | 0.12<br>0.21<br>0.21<br>0.43<br>0.03 | 0.11<br>0.54<br>0.20<br>0.11<br>0.04 | 0.11<br>0.61<br>0.13<br>0.13<br>0.02 |
| PREDICTED CLASS | CLASS 2 | CLASS 1 | CLASS 2 | CLASS 3 | CLASS 2 | CLASS 3 | CLASS 2 | CLASS 4 | CLASS 2 | CLASS 2 |
| MAX PROBABILITY | 0.52 | 0.40 | 0.62 | 0.41 | 0.45 | 0.52 | 0.56 | 0.43 | 0.54 | 0.61 |
| MEET PROBABILITY THRESHOLD? | YES | NO | YES | NO | NO | YES | YES | NO | YES | YES |
| CONFIDENCE SCORE | CLASS 2<br>0.10 | N/A | CLASS 2<br>0.60 | N/A | N/A | CLASS 3<br>0.10 | CLASS 2<br>0.30 | N/A | CLASS 2<br>0.20 | CLASS 2<br>0.55 |
| ACCUMULATOR VECTOR | 0.00<br>0.10<br>0.00<br>0.00<br>0.00 | 0.00<br>0.10<br>0.00<br>0.00<br>0.00 | 0.00<br>0.70<br>0.00<br>0.00<br>0.00 | 0.00<br>0.70<br>0.00<br>0.00<br>0.00 | 0.00<br>0.70<br>0.00<br>0.00<br>0.00 | 0.00<br>0.60<br>0.10<br>0.00<br>0.00 | 0.00<br>0.90<br>0.10<br>0.00<br>0.00 | 0.00<br>0.30<br>0.10<br>0.00<br>0.00 | 0.00<br>0.50<br>0.10<br>0.00<br>0.00 | 0.00<br>1.05<br>0.10<br>0.00<br>0.00 |
| DETECTED CLASS | NONE | NONE | NONE | NONE | NONE | NONE | NONE | NONE | NONE | CLASS 2 |

FIG. 13

| INPUT SEQUENCE | 1 | 2 | 3 | 4 | 5 | 6 | 7 | 8 | 9 | 10 |
|---|---|---|---|---|---|---|---|---|---|---|
| PROBABILITY VECTOR | | | | | | | | | | |
| PREDICTED CLASS | | | | | | | | | | |
| MAX PROBABILITY | | | | | | | | | | |
| MEET PROBABILITY THRESHOLD? | | | | | | | | | | |
| CONFIDENCE SCORE | | | | | | | | | | |
| ACCUMULATOR VECTOR | | | | | | | | | | |
| DETECTED CLASS | | | CLASS 2 | | | | CLASS 2 | | | CLASS 2 |
| FREQUENCY FILTER | NONE | NONE | NONE | NONE | NONE | NONE | NONE | NONE | NONE | CLASS 2 |

FIG. 14

MULTICLASS CLASSIFICATION SYSTEM WITH ACCUMULATOR-BASED ARBITRATION

BACKGROUND OF THE INVENTION

1. Field of the Invention

The present invention relates generally to cybersecurity, and more particularly but not exclusively to classification of an input data stream.

2. Description of the Background Art

In machine learning, multiclass classification pertains to a task of classifying input data to one of three or more classes. Multiclass classification may be performed by multinomial logistic regression (also known as softmax regression), multiclass linear discriminant analysis, using naive Bayes classifiers, using artificial neural networks, etc.

FIG. 1 shows a logical diagram of an example conventional multiclass classification system. The multiclass classification system includes a multiclass classifier 101 that has been trained to detect five different classes. The classifier 101 receives an input data 102, classifies the input data 102, and generates a probability vector 103 for the input data 102. Each element of the probability vector 103 indicates a probability that the input data 102 is one of the five classes. In the example of FIG. 1, the probability vector 103 indicates a prediction probability value, from top to bottom, for class 1, class 2, class 3, etc. More particularly, in the probability vector 103, the topmost element indicates a 0.11 (i.e., 11%) probability that the input data 102 is class 1, the next element indicates a 0.52 (i.e., 52%) probability that the input data 102 is class 2, the next element indicates a 0.21 (i.e., 21%) probability that the input data 102 is class 3, etc.

A conventional multiclass classification system selects the class with the highest predicted probably as the detected class. In the example of FIG. 1, the multiclass classification system generates a detection output 104, which detects that the input data 102 is class 2, because class 2 has the highest prediction probability value among the classes.

A multiclass classification system may be used to classify an input data stream. FIG. 2 shows the classifier 101 receiving and classifying an input data stream comprising an input data 102-1 received at time t, an input data 102-2 received at time t+1, an input data 102-3 received at time t+2, etc. The classifier 101 classifies the input data 102-1 to generate a corresponding probability vector 103-1, classifies the input data 102-2 to generate a corresponding probability vector 103-2, classifies the input data 102-3 to generate a corresponding probability vector 103-3, etc. For each probability vector 103, the multiclass classification system selects the class with the highest prediction probability value as the detected class. In the example of FIG. 2, the multiclass classification system generates a detection output 104-1 at time t-1 indicating class 2 is the detected class of the input data 102-1, a detection output 104-2 at time t-2 indicating class 1 is the detected class of the input data 102-2, a detection output 104-3 at time t-3 indicating class 2 is the detected class of the input data 102-3, etc.

The prediction accuracy of a multiclass classification system may be improved by training the classifier with more and better quality training samples. However, the inventors believe that there are multiclass classification tasks where more effective training of the classifier will only have limited effect on the prediction accuracy of the multiclass classification system.

SUMMARY

In one embodiment, a multiclass classifier generates a probability vector for individual data units of an input data stream. The probability vector has prediction probability values for classes that the multiclass classifier has been trained to detect. A class with the highest prediction probability value among the classes in a probability vector is selected as the predicted class. When the prediction probability value of the class meets a probability threshold, a confidence score is calculated based on the prediction probability value of the class. Confidence scores of the class are accumulated within a sliding window. The class is declared to be the detected class of the input data stream when the accumulated value of the class meets an accumulator threshold. A security policy for an application program that is mapped to the class is enforced against the input data stream.

These and other features of the present invention will be readily apparent to persons of ordinary skill in the art upon reading the entirety of this disclosure, which includes the accompanying drawings and claims.

DESCRIPTION OF THE DRAWINGS

FIGS. 1 and 2 show logical diagrams of an example conventional multiclass classification system.

FIGS. 4-13 show tables that illustrate an example of operation of the multiclass classification system of FIG. 3 in accordance with an embodiment of the present invention.

FIG. 14 shows a table that illustrates an example operation of the multiclass classification system of FIG. 3 in accordance with another embodiment of the present invention.

The use of the same reference label in different drawings indicates the same or like components.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 3:
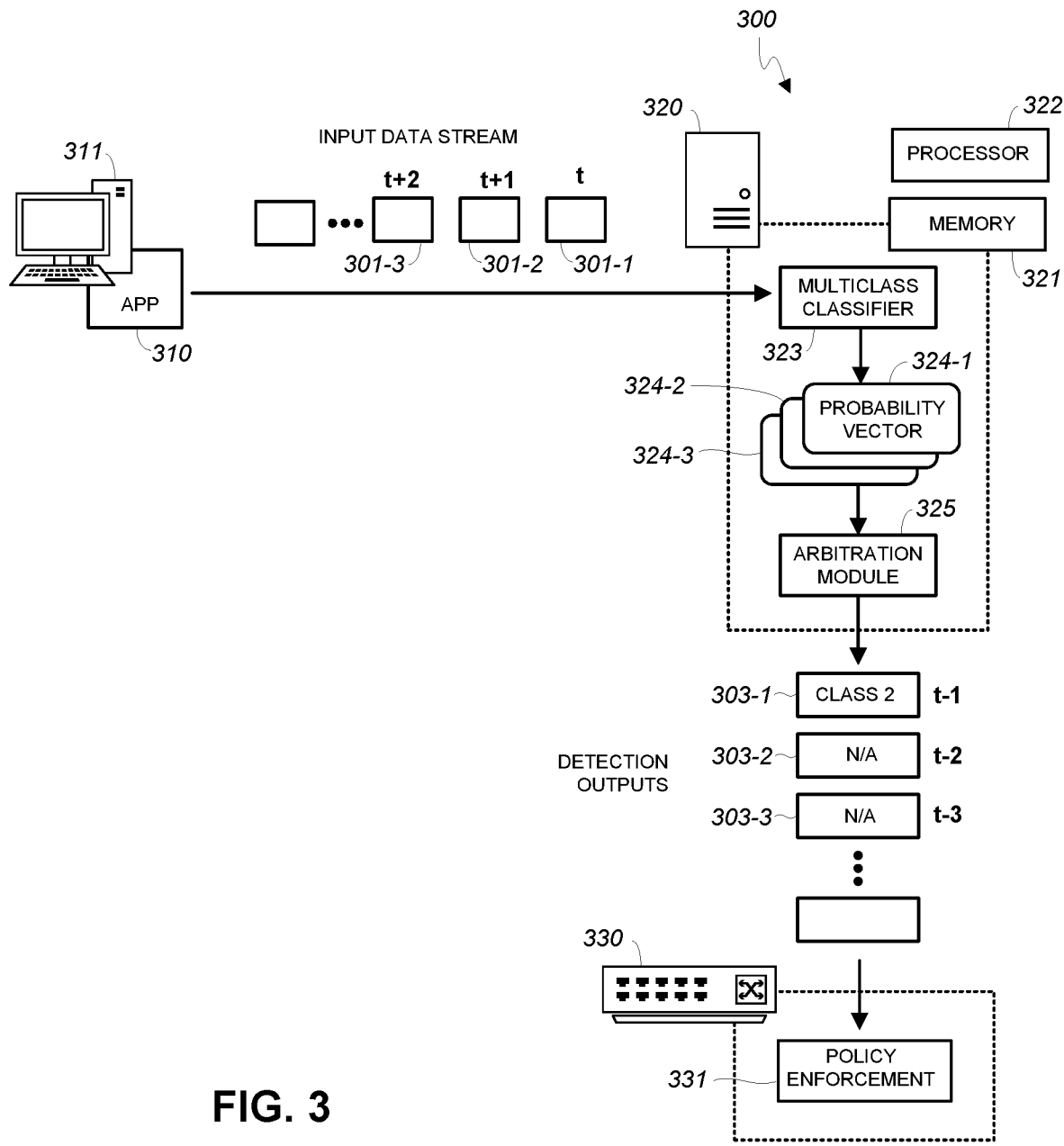
FIG. 3 shows a logical diagram of a multiclass classification system in accordance with an embodiment of the present invention.

FIG. 3 shows a logical diagram of a multiclass classification system 300 in accordance with an embodiment of the present invention. The multiclass classification system 300 is implemented in a computer system 320, which may be one or more server computers, a security appliance, a cloud computing platform, or other computing system. The computer system 320 includes a memory 321 (e.g., random access memory) and at least one hardware processor 322 (e.g., central processing unit). Instructions stored in the memory 321 are executed by the at least one processor 322 to perform the functionality of the multiclass classification system 300 as described herein. In the example of FIG. 3, the memory 321 stores instructions of a multiclass classifier 323 and an arbitration module 325.

The multiclass classifier 323 may be implemented by multinomial logistic regression, multiclass linear discriminant analysis, using naive Bayes classifiers, using artificial neural networks, using a Capsule Neural Network (CapsNet), or other suitable multiclass classification technique. In one embodiment, the multiclass classifier 323 is trained to detect different application programs based on their encrypted network traffic. Each of the application programs is mapped to a class. The application programs may include legitimate application programs (e.g., FTP application, Gmail application, Outlook application, etc.) and malicious application programs (e.g., Cridex malware, Geodo malware, Miuref malware). In other words, the multiclass classifier 323 is configured to receive encrypted network traffic of an application program as input data stream and classify the encrypted network traffic as one of a plurality of classes, with each class indicating a particular application program. The multiclass classification system 300 may maintain a mapping of classes to application programs. The multiclass classifier 323 may be trained using samples of encrypted network traffic of the application programs to be detected by the multiclass classifier 323.

In the example of FIG. 3, the multiclass classifier 323 receives an input data stream comprising a data unit 301-1 at time t, a data unit 301-2 at time t+1, a data unit 301-3 at time t+2, etc. Each data unit 301 may be a network packet and all of the data units 301 belong to the same net flow. In the example of FIG. 3, the input data stream is encrypted network traffic generated by an application program 310 hosted by a computer 311. As can be appreciated, embodiments of the present invention are suitable for input data streams other than encrypted network traffic.

The multiclass classifier 323 classifies and generates a corresponding probability vector 324 for each data unit 301. More particularly, the multiclass classifier 323 classifies the data unit 301-1 to generate a corresponding probability vector 324-1, classifies the data unit 301-2 to generate a corresponding probability vector 324-2, classifies the data unit 301-3 to generate a corresponding probability vector 324-3, etc.

A single probability vector 324 has a set of probability prediction values, with each prediction probability value indicating a probability that a data unit 301 is of the corresponding class. More particularly, each probability vector 324 includes a prediction probability value for each class that the multiclass classifier 323 has been trained to detect. For example, if the multiclass classifier 323 has been trained to detect 100 different application programs, each probability vector 324 will have 100 prediction probability values, one for each application program.

The accuracy of the multiclass classifier 323 to detect a class depends on the effectiveness of its training, e.g., the number and quality of training samples. However, even with improved training, the accuracy of the multiclass classifier 323 itself cannot be markedly improved with regards to encrypted network traffic. Because of the nature of encrypted network traffic, it is relatively difficult for the multiclass classifier 323 to identify the particular program that generated the encrypted network traffic.

Instead of generating a detection output based on a single probability vector 324, the arbitration module 325 is configured to generate a detection output based on a plurality of probability vectors 324 within a sliding prediction window, with each sliding prediction window comprising a plurality of prediction cycles. A prediction cycle is an instance or interval during which the multiclass classifier 323 receives a single data unit 301, classifies the data unit 301, and generates a corresponding probability vector 324. The number of prediction cycles in a sliding prediction window depends on the particulars of the multiclass classification system. The prediction window is sliding in that the window moves to cover the last X prediction cycles, with X being the size of the window.

In each prediction cycle, the arbitration module 325 is configured to receive a probability vector 324, which has a set of prediction probability values for the plurality of classes that the multiclass classifier 323 has been trained to detect. The arbitration module 325 selects, during the prediction cycle, a predicted class as the class with the highest prediction probability value relative to the other classes. The arbitration module 325 compares the prediction probability value of the predicted class to a probability threshold Y. The probability threshold Y helps minimize false positives. When the prediction probability value of the predicted class is greater than the probability threshold Y, the arbitration module 325 calculates a confidence score based on the prediction probability value of the predicted class. Otherwise, the arbitration module 325 discards the prediction probability value and proceeds to process the next set of prediction probability values in a next prediction cycle.

Continuing the case when the prediction probability value of the predicted class is greater than the probability threshold Y and, accordingly, a confidence score is calculated for the predicted class, the arbitration module 325 adds the confidence score of the predicted class to an accumulated value of the predicted class. In one embodiment, an accumulated value is a summation of confidence scores of a class within a sliding prediction window. The accumulated values of the plurality of classes that the multiclass classifier 323 has been trained to detect may be stored as elements of an accumulator vector. An accumulator vector is similar to a probability vector, except that each element of the accumulator vector indicates an accumulated value of a class.

The arbitration module 325 declares a predicted class as the detected class of the input data stream when the accumulated value of the predicted class is equal to or greater than an accumulator threshold Z. Otherwise, the arbitration module 325 proceeds to process the next set of prediction probability values until the accumulated value of a class is equal to or greater than the accumulator threshold Z, in which case the class is declared as the detected class of the input data stream.

In the example of FIG. 3, the arbitration module 325 generates a detection output 303-1 at time t-1, a detection output 303-2 at time t-2, a detection output 303-3 at time t-3, etc. Each detection output 303 indicates the detected class. In the example of FIG. 3, the detection output 303-1 indicates that the input data stream is detected to be class 2, meaning that the accumulated value of class 2 is equal to or greater than the accumulator threshold Z within the sliding prediction window, which is the last X prediction cycles. Similarly, the detection output 303-2 indicates that the class of the input stream has not been detected based on prediction probability values within the sliding prediction window. This is the case when none of the accumulated values of the classes in the last X prediction cycles has met the accumulator threshold Z.

In the example of FIG. 3, a computer 330 hosts a policy enforcement module 331. The computer 330 may be an endpoint computer, a security appliance, or other computing system where security policy enforcement is performed. The policy enforcement module 331 may comprise instructions that, when executed by at least one hardware processor, enforces one or more security policies. Each application program may have an assigned security policy. For example, a security policy may indicate blocking network traffic of the application program 110, which is mapped as class 2. When the detection output 303-1 indicates that the input data stream is class 2, i.e., data stream of the application program 110, the policy enforcement module 331 will enforce the security policy against the input data stream, i.e., block or initiate blocking of the input data stream comprising the data units 301-1, 301-2, etc. Blocking may include one or more actions that would prevent further transmission of the input data stream over the computer network. The functionality of the policy enforcement module 331 may be implemented in the computer 330 as shown or in other computers including the computer system 320.

FIGS. 4-13 show tables that illustrate an example of operation of the multiclass classification system 300 in accordance with an embodiment of the present invention. The rows of the tables of FIGS. 4-13 show are now explained from top to bottom.

A first row of the tables of FIGS. 4-13 indicates an "INPUT SEQUENCE", which is a sequential numbering of prediction cycles. More particularly, an input sequence number 1 corresponds to receiving and processing a data unit 301-1, an input sequence number 2 corresponds to receiving and processing a data unit 301-2, an input sequence number 3, corresponds to receiving and processing a data unit 301-3, etc.

A second row of the tables of FIGS. 4-13 shows a "PROBABILITY VECTOR" generated by the multiclass classifier 323 by classifying a data unit 301. Each element of the probability vector indicates a prediction probability value of a class. In the example of FIGS. 4-13, the prediction probability values of the classes are arranged in the probability vector from top to bottom, with class 1 being on top. In the example of FIGS. 4-13, the multiclass classifier 323 has been trained to detect five different application programs, with each application program being mapped to a class.

A third row of the tables of FIGS. 4-13 indicates a "PREDICTED CLASS". In one embodiment, the predicted class is the class with the maximum (i.e., highest) prediction probability value among the classes.

A fourth row of the tables of FIGS. 4-13, "MAX PROBABILITY", indicates the prediction probability value of the predicted class.

A fifth row of the tables of FIGS. 4-13, "MEET PROBABILITY THRESHOLD?", indicates whether or not the prediction probability value of the predicted class is greater than the probability threshold. In the tables of FIGS. 4-13, the probability threshold is predetermined to be 0.5. The probability threshold may be selected to be high enough so that two or more prediction probability values that are exactly the same will not meet the probability threshold. As can be appreciated, the probability threshold may be varied depending on the particulars of the multiclass classification system.

A sixth row of the tables of FIGS. 4-13 indicates a calculated "CONFIDENCE SCORE" that is mathematically derived from the prediction probability value of the predicted class. In one embodiment, a confidence score is calculated only when the prediction probability value of the predicted class is greater than the probability threshold. Otherwise, a confidence score is not calculated for the predicted class. In one embodiment, the confidence score is given by:

$$\text{CONFIDENCE\_SCORE} = (P\text{-}0.5) \times 5 \quad (EQ.\ 1)$$

where P is the prediction probability value of the predicted class. Other ways of calculating a confidence score based on the prediction probability value may also be employed.

A seventh row of the tables of FIGS. 4-13 shows an ACCUMULATOR VECTOR with a sliding prediction window. Each element of the accumulator vector indicates a sum of confidence scores of a class within the sliding prediction window, which in this example is the last five prediction cycles. In the tables of FIGS. 4-13, each column of input sequence represents a prediction cycle. For example, FIG. 4 shows one prediction cycle (INPUT SEQUENCE 1), FIG. 5 shows two prediction cycles (INPUT SEQUENCES 1 and 2), FIG. 6 shows three prediction cycles (INPUT SEQUENCES 1, 2, and 3), etc. In the tables of FIGS. 4-13, the sliding prediction window is five prediction cycles long. That is, each element of an accumulator vector, which is also referred to as an accumulated value, is the sum of confidence scores of a class in the last five prediction cycles. In the example of FIGS. 4-13, the accumulated values of the classes are arranged from top to bottom, with the accumulated value of class 1 being on top. For example, in FIG. 4, class 1 has an accumulated value of 0.00, class 2 has an accumulated value of 0.10, etc.

An eight row of the tables of FIGS. 4-13 indicates the DETECTED CLASS of the input data stream. A value of NONE indicates that a class has not been detected. In the tables of FIGS. 4-13, a class with an accumulated value greater than or equal to an accumulator threshold Z of 1.0 is detected to be the class of the input data stream. As can be appreciated, the accumulator threshold may be varied depending on the particulars of the multiclass classification system.

Referring now to FIG. 4, there is shown processing results of a first prediction cycle. It this example, sequence 1 is for the first data unit of an input data stream being classified. In that case, the sliding prediction window (see 401) has processing results of one prediction cycle. In the example of FIG. 4, class 2, which has a prediction probability value of 0.52, is the predicted class because class 2 has the highest prediction probability value among the classes 1-5. The prediction probability value of class 2 meets the probability threshold (which is 0.5 in this example) and gives a confidence score of 0.10 (as calculated using EQ. 1 above). The accumulated value of class 2 is its current prediction probability value, because the sequence 1 is for the first data unit of the input data stream. A class is not detected for the input data stream in the first prediction cycle because there is no accumulated value that is equal to or greater than the accumulator threshold (which is 1.0 in this example).

FIG. 5 shows processing results of a second prediction cycle (see column of input sequence 2) immediately following the first prediction cycle. In FIG. 5, the sliding prediction window (see 402) now has processing results of two prediction cycles. It is to be noted that with a sliding prediction window of size five, the prediction window will not slide until after the prediction window has processing results of five prediction cycles. In the second prediction cycle, class 1, which has a prediction probability value of 0.40, is the predicted class because class 1 has the highest prediction probability value among the classes 1-5. In the second prediction cycle, a confidence score is not calculated for class 1 because the prediction probability value of class 1 does not meet the probability threshold. Because there is no new confidence score in the second prediction cycle, the accumulated values of classes 1-5 in the accumulator vector remain the same as in the first prediction cycle. A class is not detected for the input data stream in the second prediction cycle because there is no accumulated value that is equal to or greater than the accumulator threshold.

FIG. 6 shows processing results of a third prediction cycle (see column of input sequence 3) immediately following the second prediction cycle. In FIG. 6, the sliding prediction window (see 403) now has processing results of three prediction cycles. In the third prediction cycle, class 2, which has a prediction probability value of 0.62, is the predicted class because class 2 has the highest prediction probability value among the classes 1-5. In the third prediction cycle, the prediction probability value of class 2 meets the probability threshold and gives a confidence score of 0.60. The accumulated value of class 2 is now 0.70, which is an accumulation of confidence scores of class 2 in input sequences 1 and 3. A class is not detected for the input data stream in the third prediction cycle because there is no accumulated value that is equal to or greater than the accumulator threshold.

FIG. 7 shows processing results of a fourth prediction cycle (see column of input sequence 4) immediately following the third prediction cycle. In FIG. 7, the sliding prediction window (see 404) now has processing results of four prediction cycles. In the fourth prediction cycle, class 3, which has a prediction probability value of 0.41, is the predicted class because class 3 has the highest prediction probability value among the classes 1-5. In the fourth prediction cycle, a confidence score is not calculated for class 3 because the prediction probability value of class 3 does not meet the probability threshold. Because there is no new confidence score in the fourth prediction cycle, the accumulated values of classes 1-5 in the fourth prediction cycle remain the same as in the third prediction cycle. A class is not detected for the input data stream in the fourth prediction cycle because there is no accumulated value that is equal to or greater than the accumulator threshold.

FIG. 8 shows processing results of a fifth prediction cycle (see column of input sequence 5) immediately following the fourth prediction cycle. In FIG. 8, the sliding prediction window (see 405) now has processing results of five prediction cycles. Accordingly, the sliding prediction window will slide in the next following prediction cycle. In the fifth prediction cycle, class 2, which has a prediction probability value of 0.45, is the predicted class because class 2 has the highest prediction probability value among the classes 1-5. In the fifth prediction cycle, a confidence score is not calculated for class 2 because the prediction probability value of class 2 does not meet the probability threshold. Because there is no new confidence score in the fifth prediction cycle, the accumulated values of classes 1-5 in the fifth prediction cycle remain the same as in the fourth prediction cycle. A class is not detected for the input data stream in the fifth prediction cycle because there is no accumulated value that is equal to or greater than the accumulator threshold.

FIG. 9 shows processing results of a sixth prediction cycle (see column of input sequence 6) immediately following the fifth prediction cycle. In FIG. 9, the sliding prediction window (see 406) has moved one column to the right, and now covers the processing results of input sequences 2-6. In the sixth prediction cycle, class 3, which has a prediction probability value of 0.52, is the predicted class because class 3 has the highest prediction probability value among the classes 1-5. In the sixth prediction cycle, the prediction probability value of class 3 meets the probability threshold and gives a confidence score of 0.10. The accumulator vector now indicates an accumulated value of 0.60 for class 2 (from confidence score of input sequence 3) and an accumulated value of 0.10 for class 3 (from confidence score of input sequence 6). A class is not detected for the input data stream in the sixth prediction cycle because there is no accumulated value that is equal to or greater than the accumulator threshold.

FIG. 10 shows processing results of a seventh prediction cycle (see column of input sequence 7) immediately following the sixth prediction cycle. In FIG. 10, the sliding prediction window (see 407) again has moved one column to the right, and now covers the processing results of input sequences 3-7. In the seventh prediction cycle, class 2, which has a prediction probability value of 0.56, is the predicted class because class 2 has the highest prediction probability value among the classes 1-5. In the seventh prediction cycle, the prediction probability value of class 2 meets the probability threshold and gives a confidence score of 0.30. The accumulator vector now indicates an accumulated value of 0.90 for class 2 (from confidence scores of input sequences 3 and 7) and an accumulated value of 0.10 for class 3 (from confidence score of input sequence 6). A class is not detected for the input data stream in the seventh prediction cycle because there is no accumulated value that is equal to or greater than the accumulator threshold.

FIG. 11 shows processing results of an eight prediction cycle (see column of input sequence 8) immediately following the seventh prediction cycle. In FIG. 11, the sliding prediction window (see 408) again has moved one column to the right and now covers processing results of input sequences 4-8. In the eight prediction cycle, class 4, which has a prediction probability value of 0.43, is the predicted class because class 4 has the highest prediction probability value among the classes 1-5. In the eight prediction cycle, a confidence score is not calculated for class 4 because the prediction probability value of class 4 does not meet the probability threshold. The accumulator vector now indicates an accumulated value of 0.30 for class 2 (from confidence score of input sequence 7; note that input sequence 3 has dropped out of the sliding prediction window) and an accumulated value of 0.10 for class 3 (from confidence score of input sequence 6). A class is not detected for the input data stream in the eight prediction cycle because there is no accumulated value that is equal to or greater than the accumulator threshold.

FIG. 12 shows processing results of a ninth prediction cycle (see column of input sequence 9) immediately following the eight prediction cycle. In FIG. 12, the sliding prediction window (see 409) now covers processing results of input sequences 5-9. In the ninth prediction cycle, class 2, which has a prediction probability value of 0.54, is the predicted class because class 2 has the highest prediction probability value among the classes 1-5. In the ninth prediction cycle, the prediction probability value of class 2 meets the probability threshold and gives a confidence score of 0.20. The accumulator vector now indicates an accumulated value of 0.50 for class 2 (from confidence scores of input sequences 7 and 9) and an accumulated value of 0.10 for class 3 (from confidence score of input sequence 6). A class is not detected for the input data stream in the ninth prediction cycle because there is no accumulated value that is equal to or greater than the accumulator threshold.

FIG. 13 shows processing results of a tenth prediction cycle (see column of input sequence 10) immediately following the ninth prediction cycle. In FIG. 13, the sliding prediction window (see 410) now covers processing results of input sequences 6-10. In the tenth prediction cycle, class 2, which has a prediction probability value of 0.61, is the predicted class because class 2 has the highest prediction probability value among the classes 1-5. In the tenth prediction cycle, the prediction probability value of class 2 meets the probability threshold and gives a confidence score of 0.55. The accumulator vector now indicates an accumulated value of 1.05 for class 2 (from confidence scores of input sequences 7, 9, and 10) and an accumulated value of 0.10 for class 3 (from confidence score of input sequence 6). The accumulated value of class 2 now exceeds the accumulator threshold. Accordingly, the multiclass classification system 300 detects the input data stream as class 2 (see 411).

In the above example, a class is detected as soon as the accumulated value of the class meets the accumulator threshold. In another embodiment, to minimize outlier false alarm rates, an additional filtering step is performed to validate a detected class. A detected class before the filtering step is considered as a "candidate detected class". The filtering step may require a class to be a candidate detected class at least N times within a sliding filtering window before the class is declared to be the detected class. This embodiment is now explained with reference to FIG. 14.

The table of FIG. 14 is the same as the tables of FIGS. 4-13 except for the addition of a row for a FREQUENCY FILTER (see 414). The frequency filter may be checked each time a class is detected as noted in the row for DETECTED CLASS (see 416). Values of cells that are not necessary to the understanding of this embodiment are not shown in FIG. 14. In the example of FIG. 14, the frequency filter has a sliding filtering window (see 412), which in the example of FIG. 14 is the last 10 prediction cycles. In the example of FIG. 14, class 2 is the detected class at the input sequences 3, 7, and 10 in the manner previously described. That is, the detection of class 2 at input sequences 3, 7, and 10 in FIG. 14 uses the same methodology as in FIGS. 4-13. However, in the example of FIG. 14, a detected class is considered a candidate detected class before filtering. In the example of FIG. 14, the frequency filter has a value of 3 (i.e., N=3), meaning a class must be a candidate detected class at least 3 times within the sliding filtering window to be declared as the detected class. In the example of FIG. 14, class 2 is declared as the detected class (see 413) because it is a candidate detected class at least 3 times (at input sequences 3, 7, and 10) within the sliding prediction window (see 412).

Figure 15:
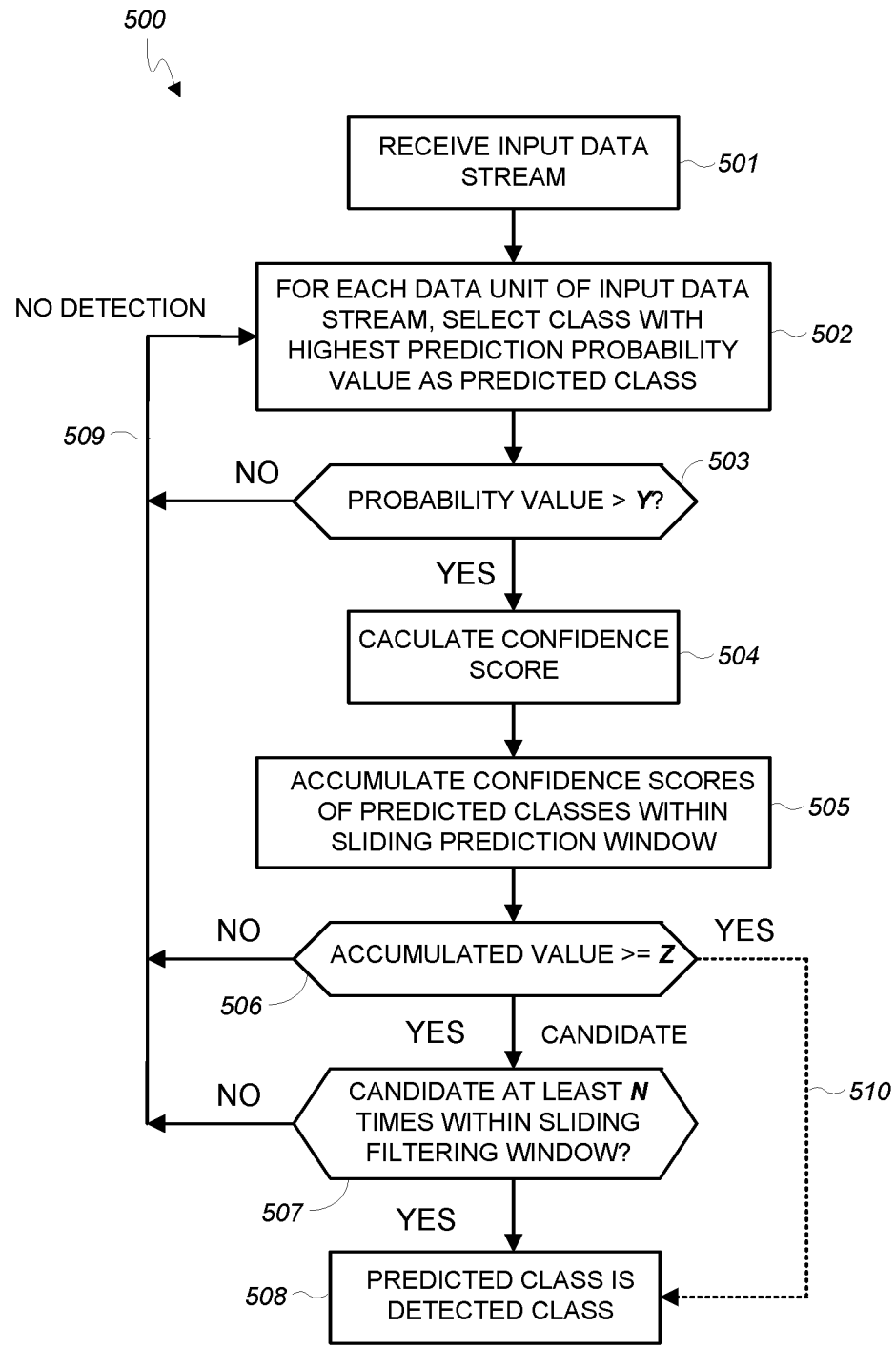
FIG. 15 shows a flow diagram of a method of detecting a class of an input data stream in accordance with an embodiment of the present invention.

FIG. 15 shows a flow diagram of a method 500 of detecting a class of an input data stream in accordance with an embodiment of the present invention. The method 500 is explained using previously described components. As can be appreciated, other components may also be employed without detracting from the merits of the present invention.

In the method 500, a multiclass classifier receives an input data stream (step 501). The multiclass classifier classifies each data unit of the input data stream to generate a plurality of prediction probability values, one for each class that the multiclass classifier has been trained to detect. The plurality of prediction probability values may be stored as elements of a probability vector. For each data unit of the input data stream, an arbitration module selects a class with the highest prediction probability value among the classes as the predicted class (step 502).

The arbitration module compares the prediction probability value of the predicted class against a probability threshold Y (step 503). If the prediction probability value is greater than the probability threshold, the arbitration module calculates a confidence score for the predicted class based on its prediction probability value (step 503 to step 504). Otherwise, no class is detected, in which case the prediction cycle ends and the multiclass classification system proceeds to process the next data unit of the input data stream (step 503 to step 502 through path 509).

The confidence scores of predicted classes within a sliding prediction window are accumulated (step 505). In one embodiment, if an accumulated value of a class is equal to or greater than an accumulator threshold Z, that class is declared to be the detected class of the input data stream (step 506 to step 508 through path 510). Otherwise, no class is detected, in which case the prediction cycle ends and the multiclass classification system proceeds to process the next data unit of the input data stream (step 506 to step 502 through path 509).

In an alternative embodiment, if an accumulated value of a class is equal to or greater than the accumulator threshold Z, that class is a candidate detected class (step 506 to step 507). If a class is a candidate detected class at least N times within a sliding filtering window, the class is declared to be the detected class (step 507 to step 508). Otherwise, no class is detected, in which case the prediction cycle ends and the multiclass classification system proceeds to process the next data unit of the input data stream (step 507 to step 502 through path 509).

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer-implemented method comprising:
receiving an encrypted input data stream that is transmitted over a computer network, the encrypted input data stream comprising a plurality of data units;
for each data unit of the plurality of data units, using a multiclass classifier to classify the data unit to generate a plurality of prediction probability values, each of the plurality of prediction probability values corresponding to a class of a plurality of classes, each of the plurality of classes indicating an application program;
selecting a particular class with a highest prediction probability value among the plurality of classes, the particular class indicating a particular application program;
calculating a confidence score of the particular class;
declaring the particular class as a detected class of the encrypted input data stream in response to an accumulated value of the particular class exceeding an accumulator threshold, wherein the accumulated value of the particular class is an accumulation of confidence scores of the particular class within a sliding prediction window, the sliding prediction window comprises a plurality of prediction cycles, and each prediction cycle is an instance of the multiclass classifier classifying a single data unit of the plurality of data units; and
in response to the particular class declared as the detected class, applying a security policy for the particular application program to the encrypted input data stream.

2. The method of claim 1, wherein applying the security policy for the particular application program includes blocking the encrypted input data stream.

3. The method of claim 1, wherein the confidence scores of the particular class within the sliding prediction window are calculated from prediction probability values of the particular class.

4. The method of claim 1, further comprising:
comparing a prediction probability value of the particular class against a probability threshold.

5. The method of claim 4, wherein the confidence score of the particular class is calculated in response to the prediction probability value of the particular class meeting the probability threshold.

6. The method of claim 1, wherein the particular class is declared as the detected class in response to the particular class having a predetermined number of accumulated values that exceed the accumulator threshold within a sliding filtering window.

7. A computer system comprising at least one processor that executes instructions to cause the computer system to:
receive an encrypted network traffic of a particular application program over a computer network;
generate a probability vector for each data unit of the encrypted network traffic using a multiclass classifier, the probability vector comprising a plurality of prediction probability values, each of the plurality of prediction probability values corresponding to a class of a plurality of classes, each of the plurality of classes indicating an application program;
for each probability vector of the plurality of probability vectors, select a particular class with a highest prediction probability value among the plurality of classes, wherein the particular class is mapped to a particular application program;
declare the particular class as a detected class of the encrypted network traffic in response to the particular class having an accumulated value that meets an accumulator threshold, wherein the accumulated value is calculated from prediction probability values of the particular class in a plurality of probability vectors generated by the multiclass classifier; and
in response to the particular class declared as the detected class, apply a security policy for the particular application program to the encrypted input data stream.

8. The computer system of claim 7, wherein the at least one processor executes the instructions to block the encrypted network traffic in accordance with the security policy for the particular application program.

9. The computer system of claim 7, wherein the accumulated value of the particular class is an accumulation of confidence scores of the particular class within a sliding prediction window comprising a plurality of prediction cycles, wherein each of the plurality of prediction cycles is an instance of the multiclass classifier classifying a single data unit of the plurality of data units.

10. The computer system of claim 7, wherein the at least one processor executes the instructions to declare the particular class as the detected class of the encrypted network traffic in response to the particular class having a predetermined number of accumulated values that exceed the accumulator threshold within a sliding filtering window comprising a plurality of prediction cycles, wherein each of the plurality of prediction cycles is an instance of the multiclass classifier classifying a single data unit of the plurality of data units.

11. A computer-implemented method comprising:
receiving an input data stream comprising a plurality of data units;
generating a probability vector for each data unit of the plurality of data units using a multiclass classifier, the probability vector comprising a plurality of prediction probability values, each of the plurality of prediction probability values corresponding to a class of a plurality of classes;
for each probability vector of the plurality of probability vectors, selecting a particular class with a highest prediction probability value among the plurality of classes;
comparing a prediction probability value of the particular class against a probability threshold;
calculating a confidence score of the particular class in response to the prediction probability value of the particular class meeting the probability threshold; and
declaring the particular class as a detected class in response to the particular class having an accumulated value that meets an accumulator threshold, wherein the accumulated value is calculated from prediction probability values of the particular class in a plurality of probability vectors.

12. The method of claim 11, wherein the accumulated value of the particular class is an accumulation of confidence scores of the particular class in a plurality of prediction cycles.

13. The method of claim 12, wherein each of the plurality of prediction cycles is an instance of the multiclass classifier classifying a single data unit of the plurality of data units.

14. The method of claim 11, wherein the accumulated value of the particular class is an accumulation of confidence scores of the particular class within a sliding window and during prediction cycles where the particular class has a highest prediction probability value among the plurality of classes, wherein each of the prediction cycles is an instance of the multiclass classifier classifying a single data unit of the plurality of data units.

15. A computer-implemented method comprising:
receiving an input data stream comprising a plurality of data units;
generating a probability vector for each data unit of the plurality of data units using a multiclass classifier, the probability vector comprising a plurality of prediction probability values, each of the plurality of prediction probability values corresponding to a class of a plurality of classes;
for each probability vector of the plurality of probability vectors, selecting a particular class with a highest prediction probability value among the plurality of classes; and
declaring the particular class as a detected class in response to the particular class having an accumulated value that meets an accumulator threshold, wherein the accumulated value is calculated from prediction probability values of the particular class in a plurality of probability vectors,
wherein the particular class is declared as the detected class of an encrypted network traffic in response to the particular class having at least a predetermined number of accumulated values that meet the accumulator threshold.

* * * * *